R. E. ADAMS.
STOVE.
APPLICATION FILED MAR. 11, 1910.

989,937.

Patented Apr. 18, 1911.
2 SHEETS—SHEET 1.

WITNESSES

INVENTOR
ROBERT E. ADAMS
BY
ATTORNEYS

R. E. ADAMS.
STOVE.
APPLICATION FILED MAR. 11, 1910.
989,937.
Patented Apr. 18, 1911.
2 SHEETS—SHEET 2.
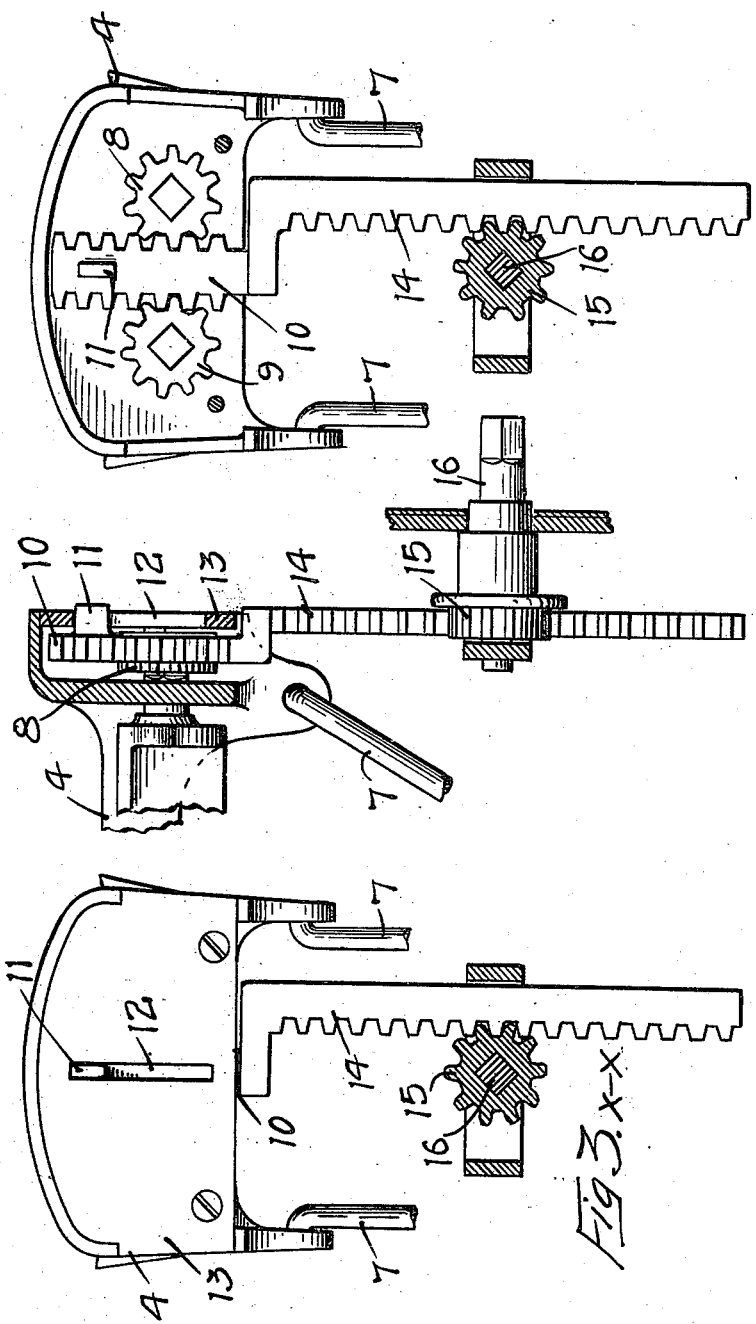
WITNESSES
INVENTOR
ROBERT E. ADAMS
BY Paul & Paul
ATTORNEYS

UNITED STATES PATENT OFFICE.

ROBERT E. ADAMS, OF MARSHALLTOWN, IOWA.

STOVE.

989,937.  Specification of Letters Patent.  Patented Apr. 18, 1911.

Application filed March 11, 1910. Serial No. 548,685.

*To all whom it may concern:*

Be it known that I, ROBERT E. ADAMS, of Marshalltown, Marshall county, Iowa, have invented certain new and useful Improvements in Stoves, of which the following is a specification.

The object of my invention is to provide a convenient means for rocking the bars of a vertically adjustable grate to the end that the shaking of the grate can be accomplished quickly and with comparatively little effort.

My invention consists generally in various constructions and combinations, all as hereinafter described and particularly pointed out in the claims.

Figure 1:
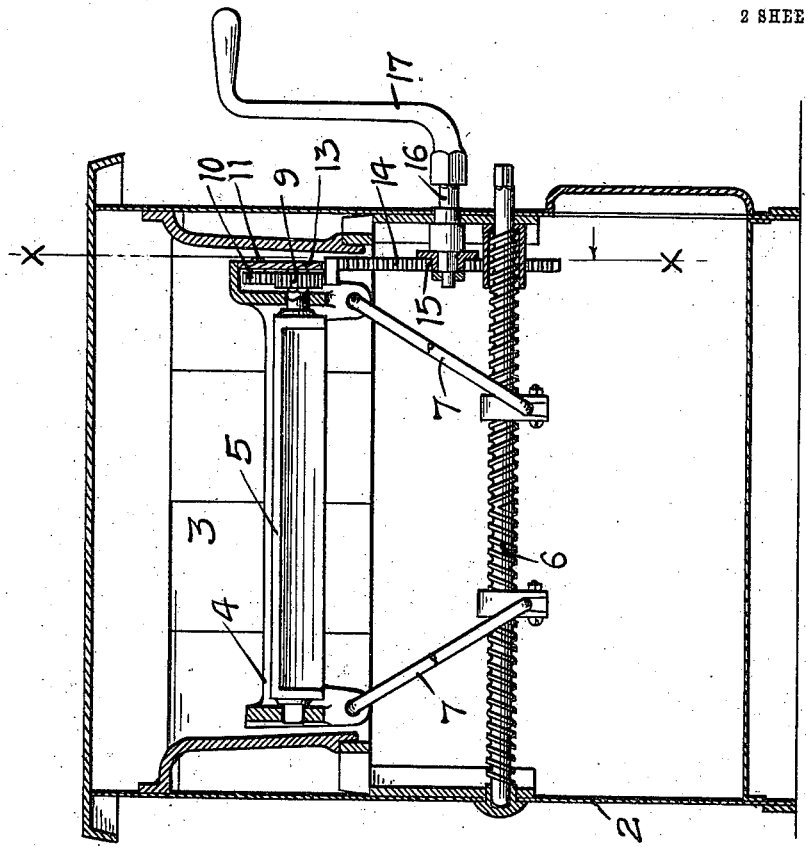
Figure 2:
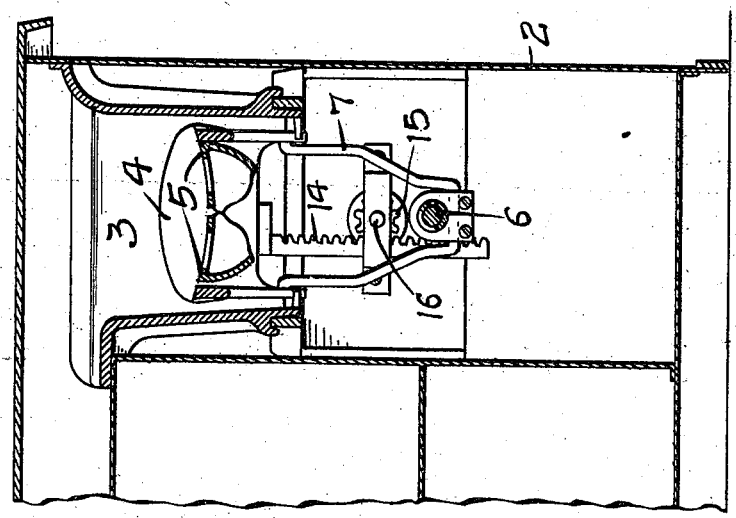

In the accompanying drawings forming part of this specification, Figure 1 is a vertical sectional view of a stove with my invention applied thereto, Fig. 2 is a transverse, vertical, sectional view of the same, Fig. 3 is a sectional view on the line x—x of Fig. 1, Fig. 4 is a detail view of the mechanism by means of which the rocking of the grate is accomplished, Fig. 5 is a side view of the same.

In the drawing, 2 represents a stove having a fire-box 3 provided with a vertically movable grate 4 having rocking bars 5. A screw 6 has connections 7 with the lower portion of the grate and when the screw is revolved the grate will be raised or lowered in the fire-box to the desired elevation. Upon the ends of the grate bar journals I provide pinions 8 and 9 with a space between them to receive a rack bar 10 having a lug 11 that is vertically slidable in a slot 12 in the plate 13. To the lower end of the bar 10 a similar bar 14 is attached, having teeth on one edge adapted to mesh with the teeth of a pinion 15 on a stub shaft 16 which projects through the wall of the stove to receive an operating crank 17. By the movement of this crank the bars 10 and 14 will be operated vertically and the rocking bars 5 oscillated in their bearings to obtain the desired shaking effect. When the grate is raised or lowered, the pinion 15 will revolve as the bar 14 moves vertically, and the position of the grate bars will remain unchanged. As soon, however, as the crank is applied to the shaft 16, and the bar 14 reciprocated, a corresponding movement will be imparted to the bar 10 and the pinions 8 and 9 will be rotated to rock the grate bars.

I do not wish to be confined in this application to the particular mechanism employed for carrying out this invention, as it is susceptible to various modifications without departing from the scope of my invention.

I claim as my invention:

1. The combination, with a stove having a fire-box and a vertically movable grate therein, the bars of said grate having pinions mounted thereon with a space between them, a vertically movable rack bar having teeth to engage said pinions, a shaft projecting through the stove, a pinion thereon meshing with teeth on the lower portion of said rack bar, means for raising and lowering said grate, said rack bar permitting said raising and lowering without rocking said grate bars, substantially as described.

2. A stove having a fire-box and vertically movable grate therein, said grate having rocking bars and pinions mounted thereon, a rack bar having teeth to engage said pinions, and vertically movable in said fire-box, a stub shaft and pinion secured thereon, said pinion meshing with the teeth of said rack bar and said stub shaft projecting through the wall of said stove and adapted to receive a wrench, for the purpose specified.

3. The combination, with a stove having a fire box and a vertically movable grate therein, said grate having pinions mounted thereon, a vertically arranged rack bar interposed between said pinions, a plate having a vertical slot to receive a lug provided on said rack bar, and means for operating said rack bar.

4. A stove having a fire box, a vertically movable grate therein and means for raising and lowering said grate, said grate having rocking bars, means for rocking said bars comprising pinions and a vertically movable rack bar and means for operating said rack bar, said pinions and said rack bar accommodating themselves to the vertical adjustment of said grate, whereby the bars of said grate may be rocked at any point in the vertical adjustment of said grate.

In witness whereof, I have hereunto set my hand this 1st day of February 1910.

ROBERT E. ADAMS.

Witnesses:
RICHARD PAUL,
L. C. CRONIN.

Copies of this patent may be obtained for five cents each, by addressing the "Commissioner of Patents, Washington, D. C."